Sept. 4, 1928.

H. C. WEISSE

COOLING RUBBER TIRE TREADS

Filed June 4, 1926

1,682,876

HUGO C. WEISSE
Inventor

By *Robert D. M Harvey*
Attorney

Patented Sept. 4, 1928.

1,682,876

UNITED STATES PATENT OFFICE.

HUGO C. WEISSE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

COOLING RUBBER TIRE TREADS.

Application filed June 4, 1926. Serial No. 113,788.

The treads used in the manufacture of pneumatic tire casings are usually formed by passing a suitably compounded rubber stock through a tubing machine or between engraved calender rolls, the result in either case being a strip formed to the desired shape from which suitable lengths are cut as desired. The die of the tubing machine or the rolls of the calender are heated and the tread strip produced is warm and plastic. It is customary to cool the tread strip before cutting it into lengths and my invention relates to a method of cooling the strip and means for carrying out that method.

In the past it has been customary to pass the tread strip onto a conveyor belt running in a tank of water to thereby cool the tread. As the rubber stock cools it shrinks and it has been the purpose to keep the tread in the tank a sufficient length of time to remove all of the shrinkage from the tread strip. To this end the tanks have been built of substantially great length or a complicated system of superposed conveyors used or the speed of the conveyor reduced. The first two expedients require expensive and cumbersome equipment and the last reduces the production. In spite of these expedients the treads are found to shrink an appreciable amount after they are cut from the strip, and it is an object of my invention to provide a method of cooling the treads so that substantially all shrinkage will take place during the cooling process, and to provide simple, compact means for carrying out such cooling operation.

I find that the subsequent shrinkage is due to the fact that the warm plastic stock has a tendency to adhere to the belt or other conveyor, heretofore used, preventing complete shrinkage from taking place and that due to the insulating properties of the conveyor the cooling action of the water is not the same on both sides of the tread strip.

According to my method I pass the tread through the tank without continuous support and with a minimum total area of the tread in contact with the supporting means.

In the accompanying drawing which illustrates one embodiment of my invention

Figure 1:
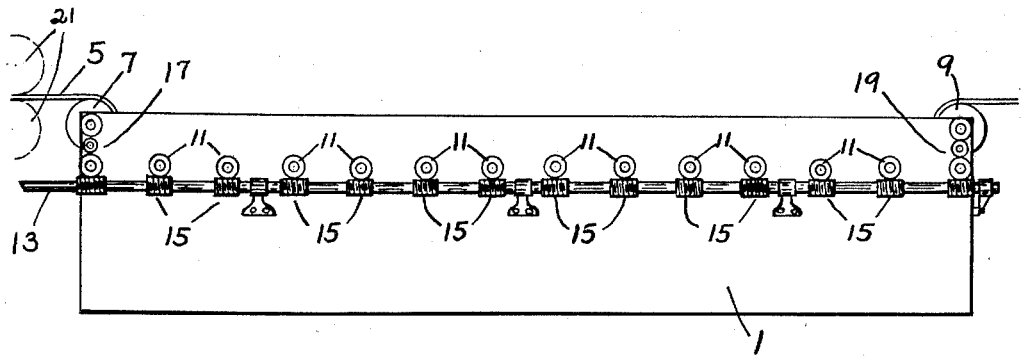
Figure 1 is a side elevation of a cooling tank for carrying out my method.

Referring to the drawings 1 designates the walls of the cooling tank, in the sides of which are journaled supporting rolls 3 for the tread strip 5. Guide rolls 7 and 9 are preferably mounted at the ends of the tank to facilitate the passage of the strip into and from the tank. The shafts of rolls 3 are provided with worm gears 11 driven from a power shaft 13 by worms 15. Rolls 7 and 9 are also driven from shaft 13 by gear chains 17 and 19 respectively. At 21 in Figure 1 I have indicated calender rolls for producing the tread strip but it will be understood that a tubing machine or other tread forming device may equally well be used.

Figure 2:
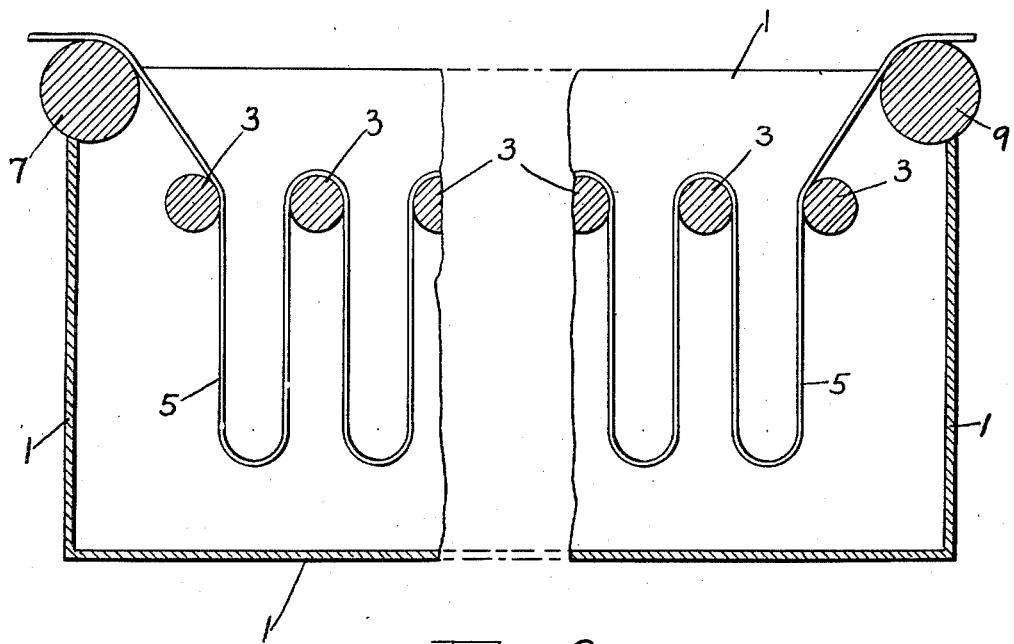
Figure 2 is a diagrammatic section on a larger scale, showing the manner in which the tread strip is supported.

As will be evident from Figure 2 the tread strip passes into the tank over roll 7 and hangs in festoons over the rolls 3 permitting the strip to shrink freely with the cooling water in contact with both sides. The rolls being driven at uniform speed the strip is passed through the tank without restraint which can in any way hinder the shrinking of the strip. The festooning of the strip further makes it possible to get a substantial length of tread material in a relatively small tank. The rolls 3 may be submerged or not as desired.

I claim:

1. The method of cooling tread stock which comprises passing it through a cooling liquid in freely suspended festoon formation.

2. The method of cooling tread stock which comprises advancing it through a cooling liquid in freely suspended festoon formation with the advancing means engaging the stock only at the under side of the upwardly extending loops of the festoon.

3. The method of cooling tread stock which comprises passing it freely over a series of rolls, driven at substantially equal speeds, and with the stock running in freely suspended festoon loops between the rolls, said loops being immersed in a cooling liquid.

In testimony whereof I have signed my name to the above specification.

HUGO C. WEISSE.